Figure 2:
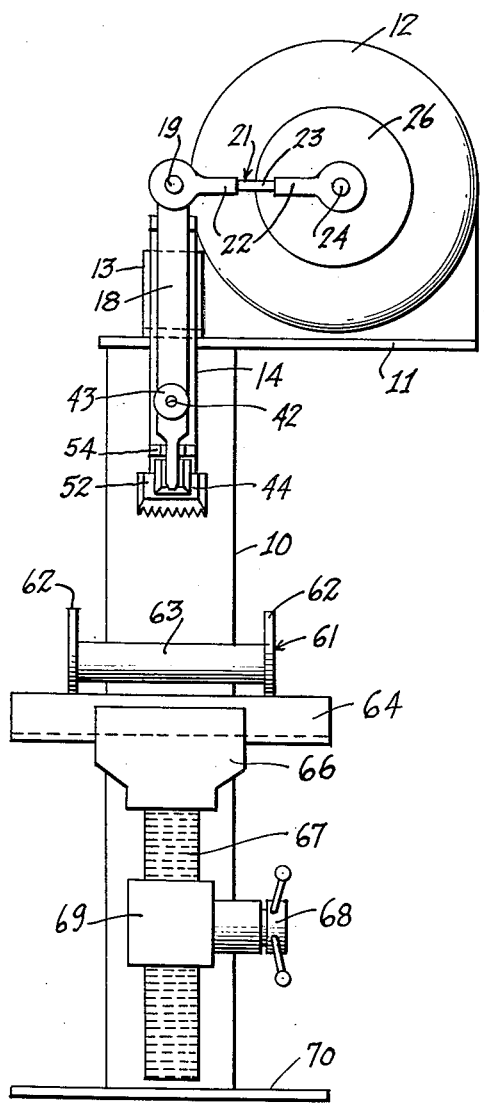

Aug. 13, 1963

E. WATKINS ETAL 3,100,414

OSCILLATING WIRE CUTTER

Filed June 26, 1961

2 Sheets-Sheet 1

INVENTORS.
ELLWOOD WATKINS
RANDALL WATKINS
BY JOHN H. WATKINS

John J. Lynch
ATTORNEY

Aug. 13, 1963

E. WATKINS ETAL 3,100,414

OSCILLATING WIRE CUTTER

Filed June 26, 1961

2 Sheets-Sheet 2

INVENTORS.
ELLWOOD WATKINS
RANDALL WATKINS
BY JOHN H. WATKINS

John J. Lynch
ATTORNEY

United States Patent Office 3,100,414
Patented Aug. 13, 1963

3,100,414
OSCILLATING WIRE CUTTER
Ellwood Watkins, Randall Stanley Watkins, and John Halden Watkins, all of Glen Road, Sandy Hook, Conn.
Filed June 26, 1961, Ser. No. 119,729
8 Claims. (Cl. 83—437)

This invention relates to wire cutting machines and in particular to one used in the salvaging of unused wire and the spools on which it is wrapped.

In a wire cutting machine that is the subject of our joint application for patent Serial No. 22,472, filed April 15, 1960, now abandoned, in the names of Ellwood Watkins et al., for High Speed Vibrating Wire Cutter, it was shown that fine wire usually wound on metal spools is easily damaged or rendered unfit for use. In order to salvage the wire, which can be melted and drawn over again, and to also salvage the metal spool which is expensive, it is necessary that the wire be completely removed from the spool. To remove the wire from a spoiled full or partially filled spool is a tedious and time consuming procedure if done by conventional methods, such as pulling off a few turns at a time or unreeling the wire which is of very fine nature.

It has been found that because copper is soft enough to yield, and can be cut by a cutter using a high speed vibratory action, the latter cannot be used in cutting through hard wires such as steel and various alloys, and it is an object of the present invention to provide a means for shearing the wire on a spool, without damage to the latter, so that the wire can be quickly removed from the spool.

A further object of the invention is to provide a cutting mechanism that employs an oscillating shearing effect so that the wire being cut can be held during the shearing action to provide a clean cut through the wire without danger of bunching the same or otherwise interfering with the efficient operation of the mechanism.

A still further object of the invention is to provide an apparatus of relatively simple structure which needs a minimum amount of adjustment, repair or replacement of parts; can be used to remove the wire from spools of different size and remove different amounts of wire from different spools without the use of special adjusting means.

Still further objects are to provide means, in a machine of the character referred to, which will produce a rapid oscillation of the cutter without transferring objectionable vibratory action to the work being done and to provide a machine which is compact, rugged in structure, and which can be used without the necessity of employing specially trained help.

Figure 1:
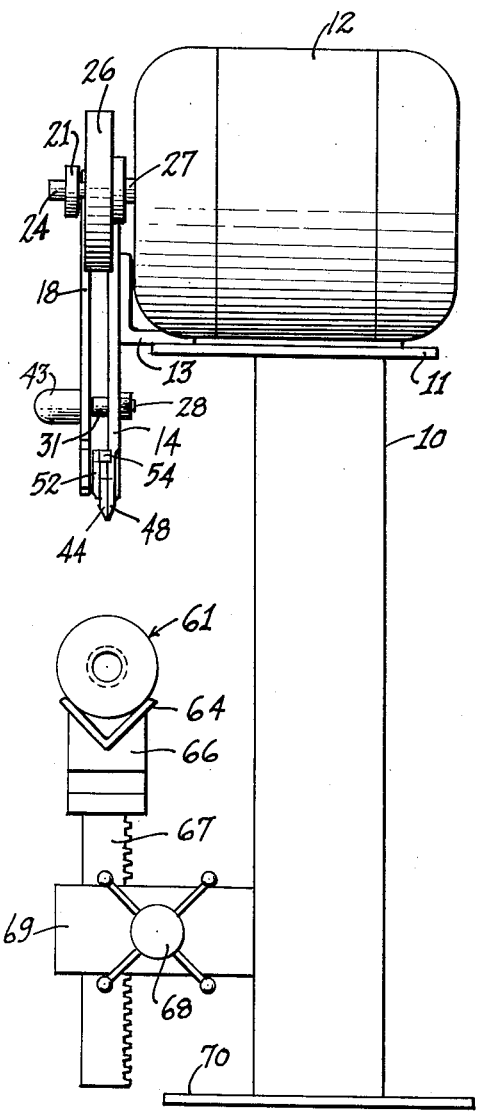
Figure 3:
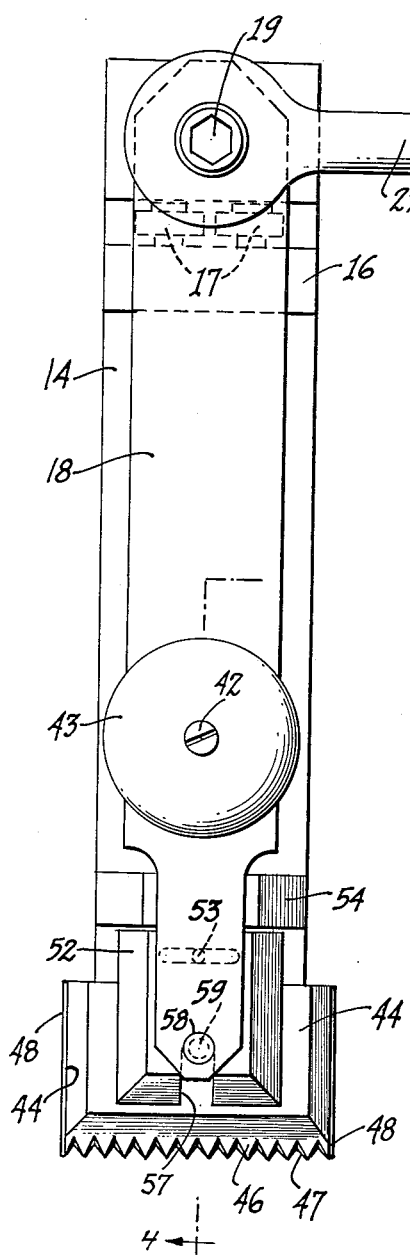
Figure 4:
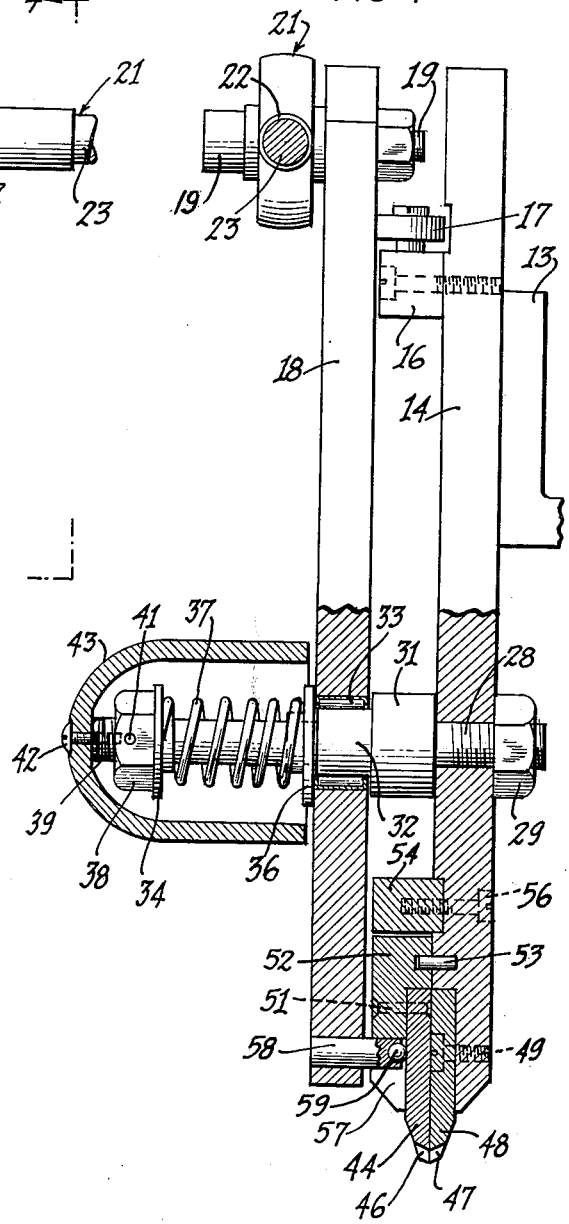

With these and other objects in view, the invention comprises certain constructions hereinafter described and then particularly pointed out in the claims and a preferred embodiment of our invention is illustrated in the accompanying drawings, in which;

FIGURE 1 is a view in side elevation of the cutting machine forming the subject of our invention, FIGURE 2 is a view in front elevation of the machine shown in FIGURE 1, the relative position of the spool feeding means being shown with respect to the cutting head of the machine, FIGURE 3 is an enlarged front or face view of the cutter head showing the relative position of the parts, and FIGURE 4 is a section taken on the line 4—4 of FIGURE 3 showing the details of structure of the cutter mounting and operating means.

Referring to the drawings in detail, 10 indicates a frame or base for the machine providing a table or top piece 11 on which a motor 12 is mounted. The top 11 also supports a bracket 13 to which is fixed a vertically disposed back plate or strip 14 carrying adjacent its upper end a bearing block 16 to which a pair of bearing rollers 17 are pivoted for the purpose of providing an anti-friction bearing for the upper end of a swingable lever arm or cutter actuator 18. The latter, at its upper end, has secured thereto by a pivot bolt 19 one end of a turnbuckle type connecting rod 21 which includes threaded end sleeves 22 which can be adjusted for spacing by turning a spacing rod 23 whose ends are threaded in said sleeves 22.

The other end of the connecting rod 21 is suitably mounted eccentrically by a pivot bolt or pin 24 to a cam 26 which in turn is suitably secured to a motor shaft 27, the cam being hereinafter referred to as an eccentric cam. Operation of the motor 12 will cause a rocking motion of the arm 18 on the bearings 17 but about a center or pivot mounting stud 28 secure in the back plate 14 by a nut 29 and being shaped to provide a spacing collar or hub 31 having a small clearance between the members 14 and 18. The stud 28 is provided with a stem section 32 which, with a needle bearing 33 in the arm 18, provides a bearing for the latter in its rapidly swinging or oscillating movement, the stud 28 also serving as the fulcrum of the arm 18.

The arm 18 is adapted to apply varying degrees of pressure to the cutter to take up wear and enhance the cutting efficiency thereof, and to this end shoulder rings 34 and 36 are mounted on stud 28 and forced apart by a helical compression spring 37, the ring 34 abutting a spring pressure adjusting nut 38 secured on the outer threaded end 39 of stud 28 by a pin 41.

The end 39 of the stud 28 has a screw 42 threaded therein, which screw holds a bell shaped cover 43 in place over the stud assembly. The ring 36 abuts the side of the operating arm 18 so that the pressure of the spring 37 as adjusted by the nut 38 can be applied not only to the arm 18 but to the movable cutter blade 44 (FIGURE 4) which is serrated along its lower edge as at 46 to match suitable like serrations 47 in a fixed blade 48 secured by screws 49 in the lower end of the back plate or strip 14.

The movable cutter blade 44 is secured by screws 51 in the shouldered recess of an oscillator or slide block 52 which has a pin and slot connection 63 with the back plate 14 and abuts at its upper edge the lower face of a laterally disposed pressure or guide block 54 secured by screws 56 to the back plate 14. The lower edge of the block 52 is recessed as at 57 to receive a ball carrier post 58 in the inner end of which is mounted an antifriction ball bearing 59 for bearing engagement with the exposed face of the movable cutter 44. The post 58 is fixed in the lower end of the arm 18 in any suitable manner and constitutes means for applying pressure to the movable blade, as above noted, under the stress exerted by the spring 37. As the arm 18 swings back and forth at high speed the block 52 oscillates horizontally in a straight line due to the coaction of the members 53 and 58, thus imparting a straight line motion to the movable cutter 44.

The movable cutter blade 44 is of slightly less width than the fixed blade 48 so that during oscillation of the cutter blade 44 the edges thereof will not project beyond the edges of the fixed blade 48 which actually serves as a guide when the spool is adjusted to the cutter with its flange positioned alongside the edge of the fixed blade 48. This is an important feature of our invention because if the cutter blade 44 projected beyond the edges of the fixed blade 48, the flanges of the spools would be damaged.

The position of the back plate 14 is such that the cutter is diametrically aligned with the spool 61 which has end flanges 62 connected by a tubular body or barrel 63, the end flanges being circular for self centering seating in a V-shaped holder 64 in which the spool 61 can be adjusted laterally manually to position either flange 62 in proper abutment with the vertical edge of the fixed cutter blade 48. The holder 64 is supported in a saddle part or member 66 secured at the upper end of a rack 67 which can be vertically adjusted by the use of a well known pinion (not shown) controlled by a handwheel 68. The rack is movable in a suitable slot in a support arm 69 extending from the frame or base 10 which rests on a foot portion 70 that may be secured to a work bench or other supporting means in any suitable manner.

In the operation of the machine, a full or partly filled spool 61 of wire is placed in the V-shaped holder 64. The latter is raised and the spool is moved so that one edge of the fixed blade 48 is in contact with the inside surface of a spool flange 62. The holder 64 is further raised as the movable cutter blade 44 cuts through the wire until the lower edge of the fixed cutter blade 48 contacts the barrel or body of the spool. This will permit the moving blade to cut the wire without damaging the body of the spool. The holder 64 is then lowered until the blades are clear of the spool. The spool is then moved until the opposite edge of the fixed blade 48 contacts the opposite spool flange. The holder 64 is then raised as the cutter blade 44 cuts through the wire until the fixed blade 48 contacts the barrel of the spool as before. After lowering the holder 64 the wire can be removed from the spool in a mass.

While there have been shown, described and pointed out the fundamental novel features of the invention, as applied to a preferred embodiment, it will be understood that various omissions, substitutions and changes in the form and details of the device illustrated, and in its operation, may be made by those skilled in the art without departing from the spirit of the invention, and it is the intion therefore, to be limited only as indicated by the scope of the following claims.

What is claimed is:

1. In a machine for removing wire from a spool having end flanges, a motor and support therefor, a back plate extending from said support, lever arm means pivoted to said plate, means for swinging said lever arm means back and forth including an eccentric rod means connected to said lever arm means and driven by said motor, wire shearing cutter means on said back plate including a fixed blade having vertical side edges and a movable blade both blades having parallel horizontally disposed serrated matched cutting edges, slide means operated by said lever arm means for oscillating said movable blade in a straight line, means for applying pressure to said lever arm means for urging the latter toward said back plate, bearing pin and ball means on said lever arm means for applying pressure to said movable blade, means for adjusting the tension of said pressure applying means, a spool support aligned with said cutter means for mounting the spool for vertical and horizontal movement relatively to said cutter means, said support including a rack, means for raising and lowering the rack to vertically move the spool support relatively to the cutter to effect severing of the work and a holder mounted on the rack and shaped to center said spool laterally with respect to the cutter and longitudinally of which holder said spool may be manually adjusted lengthwise relatively to the cutter means, and said rack means being vertically aligned with the cutter means.

2. A machine as set forth in claim 1 in which other bearing means including roller means are mounted on said back plate adjacent one end thereof to be engaged by one end of said lever arm means.

3. A machine as set forth in claim 1 in which the means operated by said lever arm means for oscillating the movable blade includes slotted block means mounted for lateral straight sliding movement on said backplate and post means operated by said lever arm means and engaging the slot in said slotted block means for oscillating the latter.

4. Apparatus for removing wire from a flanged spool, as set forth in claim 1 in which said means for severing the wire includes a toothed fixed blade and a toothed shearing blade movable relatively to said fixed blade and within the confines of the edges thereof, both blades having straight serated cutting edges and said fixed blade constituting a guide for engagement with the flanges of said spool.

5. A machine as set forth in claim 1 in which said means for applying pressure to the lever arm means includes pivot stud means for mounting the lever arm means for swinging movement intermediate its ends and a compression spring on said stud, shoulder rings coacting with said spring and one of which engages said lever arm means, and said means for adjusting the tension of said pressure applying means including spacing collar means on said stud and a nut having threaded engagement with said stud and against which one of said shoulder rings is maintained by the tension of said spring.

6. A machine for removing wire from a flanged spool comprising a motor and support therefor, a back plate depending from said support, a lever arm spaced from said back plate and extending substantially parallel thereto, stud means pivotally supporting the lever arm on the back plate intermediate the opposite ends of said lever arm means on said stud for spacing said lever arm and back plate, an eccentric cam operated by said motor, rod means connecting the eccentric cam and the upper end of said lever arm to rock the latter back and forth to cause the lower end thereof to oscillate laterally of said back plate, roller bearing means at the upper end of said back plate across which said lever arm swings, fixed and movable serrated cutter means on the lower end of said back plate said movable cutter means moving in a straight line and in wiping engagement with said fixed cutter, bearing means extending from the lower end of said lever arm for actuating said movable cutter means, means on said stud for adjusting pressure on said bearing means, spool supporting means movable toward and away from said cutter means and means on said stud for adjusting pressure on said bearing means said spool supporting means including rack means, means for raising and lowering the rack means to move the spool supporting means vertically relative to the cutter to effect severing of the work, a holder mounted on the rack means and shaped to center said spool laterally with respect to the cutter and longitudinally of which holder said spool may be manually adjusted lengthwise relatively to the cutter, and said rack means being vertically aligned with the cutter.

7. In a machine of the character set forth in claim 6 wherein said cutter means includes movable and fixed abutting cutter plates having serrated horizontal cutting edges, and the fixed cutter plate being wider than the limit movement of said movable cutter plate and constituting a guide for positioning the flange of a spool for cutting wire without damage to said spool.

8. In a machine for removing wire from flanged spools, a fixed arm, a movable arm mounted on said fixed arm, means for oscillating the movable arm, fixed and movable cutter means having lower serrated edges coacting in horizontal wire cutting action mounted at the lower end of said fixed arm, post means carried by the movable arm for engaging said movable cutter means, slide means engaged by said post means for providing a straight line movement of said movable cutter means from the arcuate oscillating motion of the lower end of said movable arm, adjustable stud means on said fixed arm for applying varying pressures to said movable cutter means through said movable arm, spool support means aligned with said cutter means for mounting a spool for vertical and horizontal movement relatively to the cutter means, said spool support means including rack means, means for raising and lowering the rack means to move the spool support means vertically relatively to the cutter to effect severing of the work, and said rack means being vertically aligned with the cutter means.

(References on following page)

References Cited in the file of this patent

UNITED STATES PATENTS

| | | |
|---|---|---|
| 1,701,148 | Dremel | Feb. 5, 1929 |
| 1,823,204 | Long | Sept. 15, 1931 |
| 1,990,418 | Rostkowski | Feb. 5, 1935 |
| 2,179,804 | Terrell | Nov. 14, 1939 |
| 2,180,331 | Hughes | Nov. 14, 1939 |
| 2,416,782 | Valish | Mar. 4, 1947 |
| 2,648,381 | Engel | Aug. 11, 1953 |
| 2,757,733 | Cunningham | Aug. 7, 1956 |
| 2,846,002 | Farmwald | Aug. 5, 1958 |

FOREIGN PATENTS

| | | |
|---|---|---|
| 27,330 | Great Britain | Nov. 4, 1899 |